United States Patent
Harris et al.

(10) Patent No.: US 9,897,891 B2
(45) Date of Patent: Feb. 20, 2018

(54) MULTI-LAYERED ELECTROPHORETIC DISPLAYS

(71) Applicant: E Ink Corporation, Billerica, MA (US)

(72) Inventors: George G. Harris, Woburn, MA (US); Olga Vladimirovna Barykina-Tassa, Boston, MA (US); Brandon MacDonald, Melrose, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/196,102

(22) Filed: Jun. 29, 2016

(65) Prior Publication Data
US 2017/0003570 A1    Jan. 5, 2017

Related U.S. Application Data

(60) Provisional application No. 62/186,565, filed on Jun. 30, 2015.

(51) Int. Cl.
*G02B 26/00* (2006.01)
*G02B 26/08* (2006.01)
*G02F 1/29* (2006.01)
*G02F 1/167* (2006.01)
*G02F 1/1333* (2006.01)
*G02B 27/22* (2018.01)

(52) U.S. Cl.
CPC .......... *G02F 1/167* (2013.01); *G02B 27/2278* (2013.01); *G02F 1/13336* (2013.01); *G02F 1/133305* (2013.01); *G02F 2201/16* (2013.01)

(58) Field of Classification Search
USPC ........ 359/237, 265–267, 270–273, 290–292, 359/295, 296, 298, 315, 321, 322; 345/107
See application file for complete search history.

(56) References Cited

U.S. PATENT DOCUMENTS

| | | |
|---|---|---|
| 4,418,346 A | 11/1983 | Batchelder |
| 5,872,552 A | 2/1999 | Gordon, II |
| 6,130,774 A | 10/2000 | Albert |
| 6,144,361 A | 11/2000 | Gordon, II |
| 6,172,798 B1 | 1/2001 | Albert |
| 6,184,856 B1 | 2/2001 | Gordon, II |
| 6,225,971 B1 | 5/2001 | Gordon, II |

(Continued)

FOREIGN PATENT DOCUMENTS

WO    WO2005041160    5/2015

OTHER PUBLICATIONS

Kitamura, T., et al., "Electrical toner movement for electronic paper-like display", Asia Display/IDW '01, p. 1517, Paper HCS1-1 (2001) Dec. 31, 2001.

(Continued)

*Primary Examiner* — Brandi Thomas
(74) *Attorney, Agent, or Firm* — Brian D. Bean

(57) ABSTRACT

Apparatus and methods for forming a composite electrophoretic display comprised of multiple, stacked electrophoretic displays are described. The individual electrophoretic displays that form the composite display may be driven separately using different driving signals. The electrical connections for the individual displays may be configured to minimize the impact of the electrical connections on the overall aesthetic of the composite display.

13 Claims, 10 Drawing Sheets

(56) References Cited

U.S. PATENT DOCUMENTS

| | | |
|---|---|---|
| 6,241,921 B1 | 6/2001 | Jacobson |
| 6,271,823 B1 | 8/2001 | Gordon, II |
| 6,672,921 B1 | 1/2004 | Liang |
| 6,788,449 B2 | 9/2004 | Liang |
| 6,866,760 B2 | 3/2005 | Paolini, Jr. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner |
| 7,075,502 B1 | 7/2006 | Drzaic |
| 7,116,318 B2 | 10/2006 | Amundson et al. |
| 7,170,670 B2 | 1/2007 | Webber |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,411,719 B2 | 8/2008 | Paolini, Jr. et al. |
| 7,420,549 B2 | 9/2008 | Jacobson |
| 7,453,445 B2 | 11/2008 | Amundson |
| 7,492,497 B2 | 2/2009 | Paolini, Jr. |
| 7,513,813 B2 | 4/2009 | Paolini, Jr. et al. |
| 7,535,624 B2 | 5/2009 | Amundson et al. |
| 7,649,674 B2 | 1/2010 | Danner |
| 7,679,814 B2 | 3/2010 | Paolini, Jr. et al. |
| 7,839,564 B2 | 11/2010 | Whitesides et al. |
| 8,009,348 B2 | 8/2011 | Zehner |
| 8,319,759 B2 | 11/2012 | Jacobson |
| 8,760,415 B2 | 6/2014 | Khan |
| 8,797,634 B2 | 8/2014 | Paolini, Jr. |
| 9,341,916 B2 | 5/2016 | Telfer et al. |
| 2002/0033793 A1* | 3/2002 | Machida .............. G02F 1/167 345/107 |
| 2012/0007487 A1* | 1/2012 | Mabeck .............. G02F 1/167 313/110 |
| 2014/0340430 A1 | 11/2014 | Telfer |
| 2014/0362131 A1* | 12/2014 | Paolini, Jr. .............. G02F 1/167 345/697 |

OTHER PUBLICATIONS

Yamaguchi, Y., et al., "Toner display using insulative particles charged triboelectrically", Asia Display/IDW '01, p. 1729, Paper AMD4-4 (2001) Dec. 31, 2001.

* cited by examiner

MULTI-LAYERED ELECTROPHORETIC DISPLAYS

RELATED APPLICATIONS

This application claims priority to U.S. Provisional Application No. 62/186,565, filed Jun. 30, 2015, the content of which is incorporated herein by reference in its entirety.

BACKGROUND

A collection of artistic media such as ceramic tile, cloth, photographs, or glass can be assembled to create a larger work, such as a mosaic or collage. The collection provides a mixture of shapes and textures that cannot be achieved in a conventional flat medium, such as a painting or a photograph. However, once the work is assembled, it is typically static. That is, the color of the individual objects does not change, and the overall shape of the work remains the same over time.

By incorporation multiple electrophoretic elements into a single work, an artist can create a work that incorporates a variety of colors and shapes, but the resultant work can change also change color (on demand) after it is completed. Additionally, three-dimensional objects with multiple layers of electrophoretic materials can be constructed that appear to move, grow, and shrink with time as the state of the electrophoretic media is varied. Works may also include some combination of layered electrophoretic elements in addition to other conventional media, such as glass, tile, paper, stone, wood, or cloth.

SUMMARY

The invention is a composite electrophoretic display. The composite display includes at least two discrete electrophoretic displays physically stacked with respect to each other. The first and second electrophoretic displays each include a front electrode, a rear electrode, and an electrophoretic medium between the front electrode and the rear electrode. In addition, the composite display further comprises drive circuitry coupled to the two discrete electrophoretic displays and configured to drive the two discrete electrophoretic displays separately by providing drive signals to the displays. In some embodiments, the electrophoretic displays are layered on top of one another. In some embodiments, the two discrete electrophoretic displays are substantially different in size (e.g., area) or shape. In other embodiments the displays are in different planes, thus, when they are brought together, the displays define a three dimensional object. The composite electrophoretic display is not limited to two displays, as three, or more displays may be incorporated into the composite electrophoretic display and driven with the drive circuitry. Other structural elements, such as wood, metal, glass, stone, ceramic, or plastic may also be incorporated into the composite electrophoretic display.

In some embodiments each electrophoretic display is configured to switch between two or more colors. The two or more colors of the individual layers may be the same between layers or they may be different between layers. In some embodiments, all of the layers have a first color in common, but none of the second colors are the same. The electrophoretic layers may include active matrix electrodes, or segmented electrodes, or combinations thereof. In some embodiments, the front electrode of the first or second display is transparent.

In some embodiments, a composite electrophoretic display comprises first, second, and third electrophoretic displays. The first electrophoretic display overlays at least a portion of the second and third electrophoretic displays, and hides a seam where the second and third electrophoretic displays touch. In some instances, the second and third displays are viewable through the first display.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
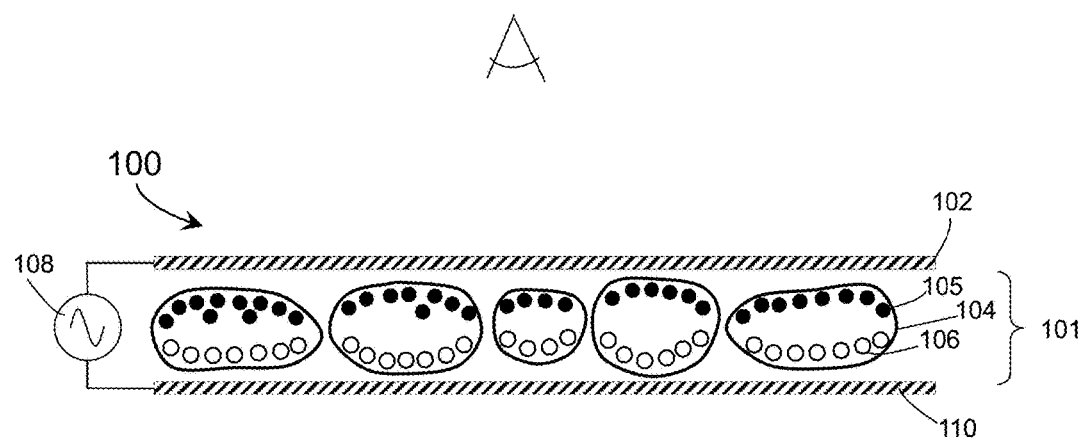
FIG. 1 is a cross-sectional diagram of an example of an electrophoretic display.

Aspects of the present application relate to a composite display formed by stacking or layering discrete electrophoretic displays. Two or more electrophoretic displays may be stacked (with respect to a viewing side) and physically connected to create a stacked display that shows a variety of shapes and colors. Additionally, the two or more electrophoretic displays can be arranged such that one or more of the displays extends into space to create a three-dimensional display, with each constituent display being individually controllable.

Various features of the composite displays may facilitate their use for beneficial purposes, such as in architectural displays. One such feature is flexibility. Flexibility of a composite display may be controlled by the flexibility of the individual electrophoretic displays, and in some embodiments, the composite display may have a flexibility allowing it to bend and/or conform to a three-dimensional shape. Another feature relates to the ability to shape the individual electrophoretic displays. An electrophoretic display may be shaped using any suitable technique (e.g., cut with a laser cutter or scissors). In some embodiments, individual electrophoretic displays may be uniquely shaped such that when the displays are stacked to form a composite display at least a portion of each individual display is visible from a surface of the resulting composite display. For example, an opening in a first individual display closer to the surface of the composite display may allow a second individual display underneath the first individual display to be visible. Another feature relates to the ability to individually control the individual electrophoretic displays making up the composite display. Thus, individual electrophoretic displays may be driven separately using different drive signals to create different colors, patterns, or other visual effects. In addition, "conventional" materials such as wood, metal, rock, stone, glass, ceramic, or fabric may be incorporated into the composite displays to achieve a desired look or to facilitate assembly of the display components.

Aspects of the present application relate to the manner in which electrical connection is made to individual electrophoretic displays of a composite display. An electrophoretic display of the composite display may include an electrophoretic medium between a front electrode and a rear electrode. In some embodiments, an electrophoretic display may have segmented electrodes such that portions of the display can be switched independently of other portions of the display. In some embodiments, the electrophoretic display may be configured to have an active matrix of electrodes that allow individual pixels to be controlled. In a composite display with multiple electrophoretic displays, the electrodes may be coupled to drive circuitry through electrical connections such that the drive circuitry is configured to provide drive signals to the individual electrophoretic displays. The drive circuitry can also be configured to allow control of individual electrode segments or pixels in a display.

Applicants appreciate that electrical connections between the electrophoretic displays and the drive circuitry can negatively impact the visual appearance of the composite display. Accordingly, some aspects of the present application provide electrical connections in an unobtrusive and compact manner, which may improve the visual appearance of the composite display. In some embodiments, the electrical connections for multiple electrophoretic displays of a composite display may couple to a single control circuit. Additionally, the individual electrophoretic displays may be configured to improve ease of making these electrical connections by offsetting the electrical connection region for each display with respect to the other displays.

The various aspects described above, as well as further aspects, will now be described in detail below. It should be appreciated that these aspects may be used alone, all together, or in any combination of two or more, to the extent that they are not mutually exclusive.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

The electrophoretic displays described herein are primarily particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,982,178; and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. No. 7,075,502; and U.S. Patent Application Publication No. 2007/0109219;

(f) Methods for driving displays; see for example U.S. Pat. Nos. 7,012,600; and 7,453,445;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays or electro-osmotic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface. Electrophoretic media may also be incorporated that allow for intermediate states of transmission, in addition to "open" and "closed." Such systems are disclosed in U.S. Pat. No. 7,492,497, which is incorporated herein by reference in its entirety. In layered composite electrophoretic systems, as described herein, one or more layered electrophoretic displays may include two transparent electrodes, thereby giving the ability for the one or more layers to change transmission through the electrophoretic display in addition, or alternatively, to changing color. Other types of electro-optic media may also be used in the displays of the present invention.

In some embodiments, one or more electrophoretic displays used to form a composite display may be an electrophoretic display. A cross-sectional view of exemplary electrophoretic display architecture is shown in FIG. 1. Display 100 includes an electrophoretic medium layer 101 which may comprise a plurality of capsules 104 each having a capsule wall surrounding fluid and electrophoretic particles 105/106 suspended in the fluid. The electrophoretic medium layer 101 is between electrodes 102 and electrode 110. The electrophoretic particles 105/106 may be electrically charged and responsive to an electric field created by the electrode 102 and electrode 110. As shown in FIG. 1, electrophoretic particles 105 and 106 are differently colored, and of opposite charge, so that with the application of an electric field between electrodes 102 and 110, black electrophoretic particles 105 move to the top of each capsule while white electrophoretic particles 106 move to the bottom of each capsule. Examples of similar electrophoretic medium layers are described in U.S. Pat. Nos. 6,982,178 and 7,513,813, which are incorporated herein by reference in their entireties.

While the displays shown here are described with respect to a two-particle system, it is to be understood that the same principles of overlaid electrophoretic displays can be applied to more complex electrophoretic displays, including electrophoretic displays having more than two particles and the ability to produce a wide variety of colors, such as those described in U.S. Patent Publication 2014/0340430, which is incorporated by reference herein in its entirety. It is additionally understood that composite electrophoretic displays of the invention may use complex waveforms, such as those described in U.S. Patent Publication 2014/0340430 to achieve various color states.

Reference to the two electrodes may be described based on the viewing surface of the display. For example, electrode 102 may be referred to as a front electrode, and electrode 110 may be referred to as a rear electrode if the surface of display 100 proximate to electrode 102 is the viewing surface. Electrode 102 or electrode 110 may be optically light-transmissive. In some embodiments, both electrodes are optically light-transmissive. Electrodes 102 and/or 110 may be a single common light-transmissive electrode on one side of the electrophoretic medium layer 101 extending the length of the display. Electrode 110 lies on the opposite side of the electrophoretic medium layer 101 from the electrode 102. In some embodiments, the electrode 110 may also be a common electrode like the electrode 102, extending the length of the display 100. Alternatively, the electrode 110 may be pixelated to define pixels of the display. In some embodiments, electrode 110 is segmented or comprises an active matrix, e.g., an array of thin film transistors (TFT backplane).

The display 100 also includes a voltage source 108 coupled to the electrodes 102 and 110 and configured to provide a drive signal to those electrodes. The provided voltage then creates an electric field between the electrodes 102 and 110. Thus, the electric field experienced by the electrophoretic medium layer 101 may be controlled by varying the voltage applied to the electrodes 102 and 110, and in the scenario in which one or both of those electrodes is pixelated varying the voltages applied to the desired pixels may provide control over the pixels of the display. Particles 105/106 within the electrophoretic medium layer 101 may move within their respective capsules 104 in response to the applied electric field created by the voltage between electrodes 102 and 110.

The electrodes 102 or 110 may be flexible, providing flexibility to the display 100. For example, the electrodes 102 or 110 may be formed from indium tin oxide (ITO) and polyethylene terephthalate (PET). At suitably thin dimensions, the ITO/PET electrode is flexible. The substrate may be selected to optimize flexibility while providing mechanical support to the display. Any substrates for the electrodes may be formed of a material and with a dimension providing desired flexibility. Thus, in some embodiments, the electrode 102 and/or electrode 110 may be less than, for example, 15 mil, less than 10 mil, or any value within those ranges, or any other value providing desired flexibility in those situations in which a flexible display is desired. Also, as described above, the electrode 102 may represent a viewing side of the display 100, and thus use of a light transmissive substrate coated with ITO may be beneficial. Still, other electrode materials may be used as alternatives. For ease of illustration, the substrates are not illustrated separately in FIG. 1.

While FIG. 1 illustrates a microcapsule type electrophoretic display, various types of electrophoretic displays may be used according to the techniques described in the present application or those cited previously. Electrophoretic displays suitable for use with the invention include encapsulated electrophoretic displays, microcell-type electrophoretic displays, and polymer dispersed electrophoretic image displays (PDEPIDs). It is conceivable that a composite electrophoretic display of the invention may also incorporate other electro-optic media, such as rotating ball displays, electrochromic displays, liquid crystal displays (LCD), polymer-dispersed liquid crystal displays (PDLCD), light emitting diodes (LED), and organic light emitting diodes (OLED).

The electrophoretic displays described herein may have any suitable overall thickness, and in some embodiments may be small. For example, the display 100 may be small in at least some embodiments, which may contribute to its flexible nature. For example, the electrodes 102 and 110 may be between 1 mil (thousandth of an inch) and 10 mil, such as 5 mil each, or between 0.1 mm and 0.5 mm. The electrophoretic medium layer may be between 0.5 mil and 5 mil, such as 1 mil, or between approximately 0.03 mm and 0.06 mm. In some embodiments, the display 100 may have a total thickness of approximately 10-15 mil, or between approximately 0.2 mm and 0.4 mm. In some embodiments, the overall thickness of the electrophoretic display may be thicker to provide structure and support to the display. In some embodiments, additional layers, such as webbing embedded in an adhesive, may be added to the display to provide structure and support. The listed examples of dimensions are non-limiting, as other dimensions may be used.

As previously described, aspects of the present application relate to stacking multiple electrophoretic displays to form a composite display. Individual displays may vary in size and/or shape within a composite display. The displays that form the composite display may have any suitable dimensions, examples of which have been described above for display 100. In some embodiments, edges of individual displays making up a composite display may not align in the resulting composite display. That is, the individual displays may intentionally be shaped differently or positioned in a manner allowing at least a portion of each of the individual displays to be seen from a viewing side of the composite display. In other embodiments, the edges of individual displays are aligned and touching so as to create a seam between the displays. The displays will typically include at least one light-transmissive electrode per display, however, in some embodiments, both electrodes, 212 and 220, of the front electrophoretic display will be light-transparent to allow a viewer to see through the front electrophoretic display 211 to the rear electrophoretic display 201. In some embodiments electrodes 202, 212, and 220 are light-transparent.

Figure 2:
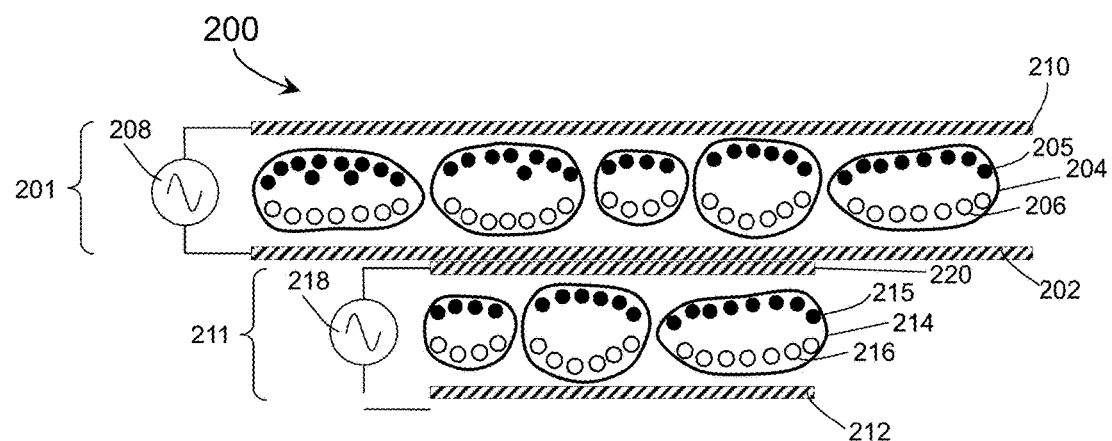
FIG. 2 is a cross-sectional diagram of an example of a composite display including two stacked electrophoretic displays.

FIG. 2 illustrates an exemplary composite display 200 including two electrophoretic displays 201 and 211 of differing sizes stacked together in the z-direction. While composite display 200 includes two individual electrophoretic displays, it should be appreciated that any suitable number of electrophoretic displays may be stacked to form a composite display. As shown in FIG. 2, electrophoretic display 201 is longer in the x-direction than electrophoretic display 211, and the edges of the two electrophoretic displays are not aligned. Electrophoretic displays 201 and 211 are adhered together such that electrode 210 of display 201 is proximate to electrode 212 of display 211. Although not shown in FIG. 2, one or more layers of additional materials may be provided between displays to insulate electrodes from neighboring displays or to secure their positions with respect to each other, e.g., with an adhesive. Such materials may also include lamination adhesives to adhere neighboring displays together. In some embodiments, a layer may provide both adhesion and electrical insulation properties between two electrophoretic displays. Additionally or alternatively, materials may be provided to the composite display to provide a desired level of flexibility to the composite display. In some embodiments, additional materials may be provided as support layers for the electrophoretic display such that one or more displays may be conformed into a suitable shape.

Electrophoretic displays within a composite display may contain different types of electrophoretic media. In some embodiments, the electrophoretic media may vary in color among the discrete displays. For purposes of illustration, displays 201 and 211 are both illustrated as being electrophoretic displays of the type previously described in reference to FIG. 1. That is, an electrophoretic medium layer includes capsules (204 for display 201 and 214 for display 211) containing electrophoretic particles (205/206 for display 201 and 215/216 for display 211). In those embodiments in which two of more individual electrophoretic displays of a composite display differ in color, the difference in color may be provided in any suitable manner depending on the type of electrophoretic displays included. For example, particles 205/206 within capsules 204 may be a different color and/or hue than particles 215/216 within capsules 214. Additionally or alternatively, an electrophoretic display within a composite display may have more than one type of particle, such as particles of multiple colors and/or hue. In some embodiments, one type of particle is the same between electrophoretic displays 201 and 211, while the second type of particle is different. For example, in an embodiment, particles 205 and 215 are identical, while particles 206 and 216 are different from each other and different from particles 205 and 215. Additionally, the electrophoretic medium, itself, may be colored, e.g., with a dye, to provide the desired visual effects.

Drive circuitry connected to each electrophoretic display of a composite display may be used to drive each individual display separately from the other electrophoretic displays within the composite display. As illustrated in FIG. 2, drive circuitry for display 201 may include voltage source 208 coupled to electrodes 202 and 210, and drive circuitry for display 211 may include voltage source 218 coupled to electrodes 212 and 220. In this configuration, drive signals for each electrophoretic display may be individually selected to achieve a desired visual effect. In some embodiments, display 201 and 211 may use the same drive circuitry, but the voltages on display 201 and 211 are controlled with a separate element, such as a digital switch. In other embodiments, voltage sources 208 and 211 are coordinated with a controller (not shown).

A composite display may be configured to be viewed from any angle and/or surface of the composite display, and in some embodiments, may be intended to be viewed from multiple angles, such as when the composite display is used as an architectural piece. As an example, composite display 200 shown in FIG. 2 may be viewed from a surface proximate to electrode 212 such that portions of both displays 201 and 211 are visible to the viewer. If displays 201 and 211 have particles with differing colors, then a viewer may see a pattern constructed from these different displays. Composite display 200 may also be configured to be viewed from a surface proximate to electrode 210 where a viewer would be unable to see display 211. However, in some embodiments, display 201 may be configured to achieve different visual effects on either side of the display. For example, display 201 may contain two different colors and be driven such that one side of display 201 (for example, viewing electrode 202) has a different color than the other side (for example, viewing electrode 210) such that a viewer proximate to electrode 210 may see a different color for display 201 than a viewer viewing the composite display 200 from a side proximate to electrode 212.

Figure 3:
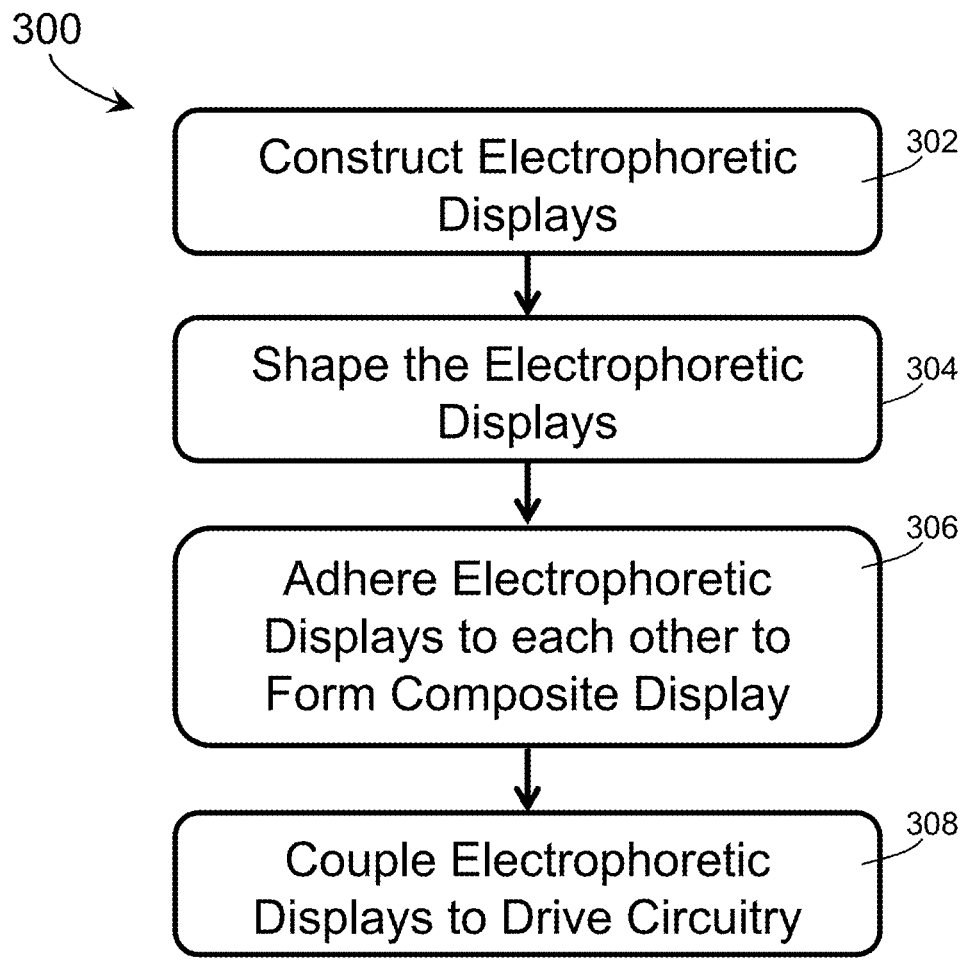
FIG. 3 is a schematic illustrating an exemplary method for forming a composite display.

Aspects of the present application relate to a manner of forming a composite display of the types described herein. FIG. 3 illustrates exemplary method 300 for forming a composite display according to aspects of the present application. Method 300 begins with act 302 of constructing the electrophoretic displays to be used in the composite display. Considering a single electrophoretic display, the display may be fabricated by laminating the two electrodes (front and rear electrodes) with the electrophoretic layer. For example, the front electrode and electrophoretic layer may be affixed to each other and may have a backing lamination adhesive affixed thereto. The lamination adhesive may be removed and the front plane laminate affixed to the rear electrode. In some embodiments, a roll-to-roll process may be used, in which the front electrode and electrophoretic layer are rolled onto the rear electrode. Examples of this type of processing are described in U.S. Pat. Nos. 6,982,178 and 7,513,813, which are incorporated herein by reference in their entireties. These techniques may be used to manufacture displays such as display 100 of FIG. 1 and displays 201 and 211 of FIG. 2. Alternative processes for making the display may be used. Again, the electrophoretic displays may be encapsulated electrophoretic displays, microcell-type electrophoretic displays, or polymer-dispersed electrophoretic displays.

Electrophoretic displays may be shaped at act 304 to have any suitable shape and/or dimension as desired. Any suitable technique for shaping the display may be used accordingly, such as laser cutting, using scissors, or using other cutting tools. In such situations, an optional barrier layer or protective sheet, or an edge seal may be applied to the display to keep out moisture and/or prevent leakage of electrophoretic materials from the display. Examples of such seals are described in U.S. Pat. No. 7,649,674, which is incorporated herein by reference in its entirety.

Individual electrophoretic displays may be shaped such that when combined into the resulting composite display a desired overall visual effect is achieved. Shaping of the electrophoretic displays may include providing electrical connection regions to couple individual displays to drive circuitry. The shape of the resulting composite display and placement of the electrical connection regions within each display may be considered when shaping the individual electrophoretic displays. The electrical connection regions may be positioned in a compact and/or unobtrusive manner to improve the visual aesthetics of the composite display. In some embodiments, the electrical connection regions of the multiple displays may be located within one portion of the composite display. In some embodiments, two or more electrophoretic displays may have offset electrical connection regions to improve ease of coupling the individual displays to drive circuitry.

A composite display may be formed by adhering the electrophoretic displays together in a stacked configuration. See act 306 of the method 300. Material with adhesive properties may be provided between the displays to adhere the displays together. Pressure sensitive adhesive layers may be used to adhere displays together. Adhesive materials may be laminated on an individual display before cutting the individual display into a desired shape. Alternatively or additionally, application of the adhesive materials may be provided during construction of the composite display to reduce the amount of adhesive layer exposed in the composite display. For example, adhesive materials may be patterned on a surface of the display such that certain regions of the display have the adhesive material. The separate electrophoretic displays may also be coupled with fasteners, tapes, etc.

Individual electrophoretic displays of a composite display may then be connected to drive circuitry in act 308. According to aspects of the present application, electrical connection regions on individual displays may be coupled to drive circuitry using any suitable technique such as through soldering, conductive glue, pin connections, and/or other types of electrical connections. Some embodiments may use rivet connections formed by inserting a conductive connector through an opening in the two electrodes and the electrophoretic layer of the display. In such embodiments, the connector may be positioned to mechanically and electrically contact one of the two electrodes. In some embodiments, a printed circuit board (PCB) holding drive circuitry for one or more electrophoretic displays in a composite display is coupled to an electrode of the one or more displays. Thus, as described previously, control of the individual electrophoretic displays of a composite display may be provided.

Figure 4A:
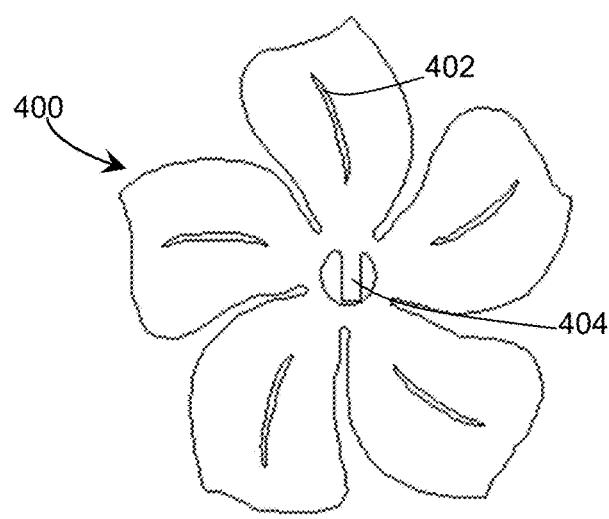
FIGS. 4A-4C are schematics illustrating different electrophoretic display layers for an exemplary composite display.
Figure 4B:
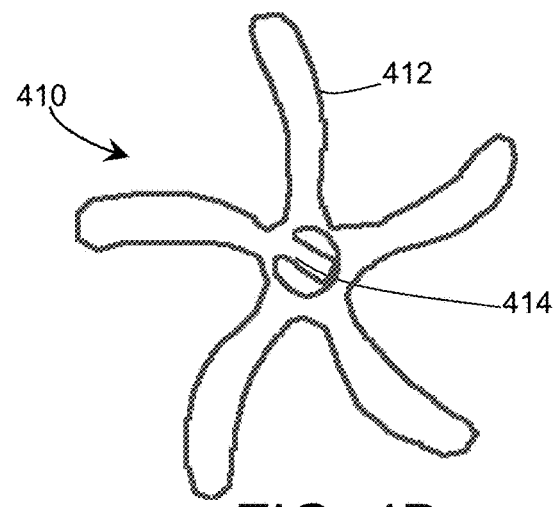
Figure 4C:
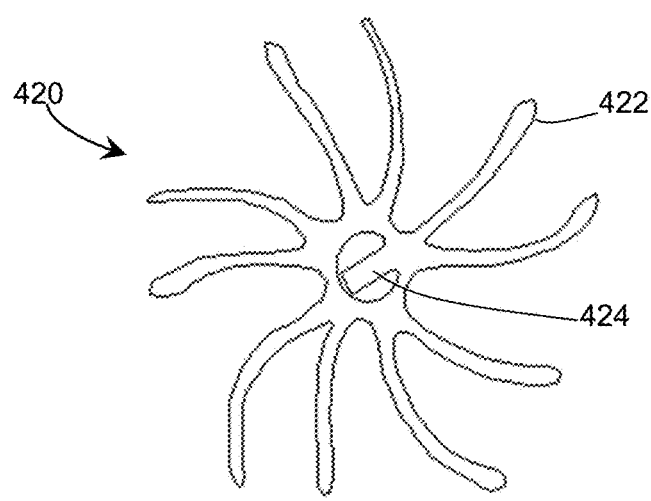
Figure 5:
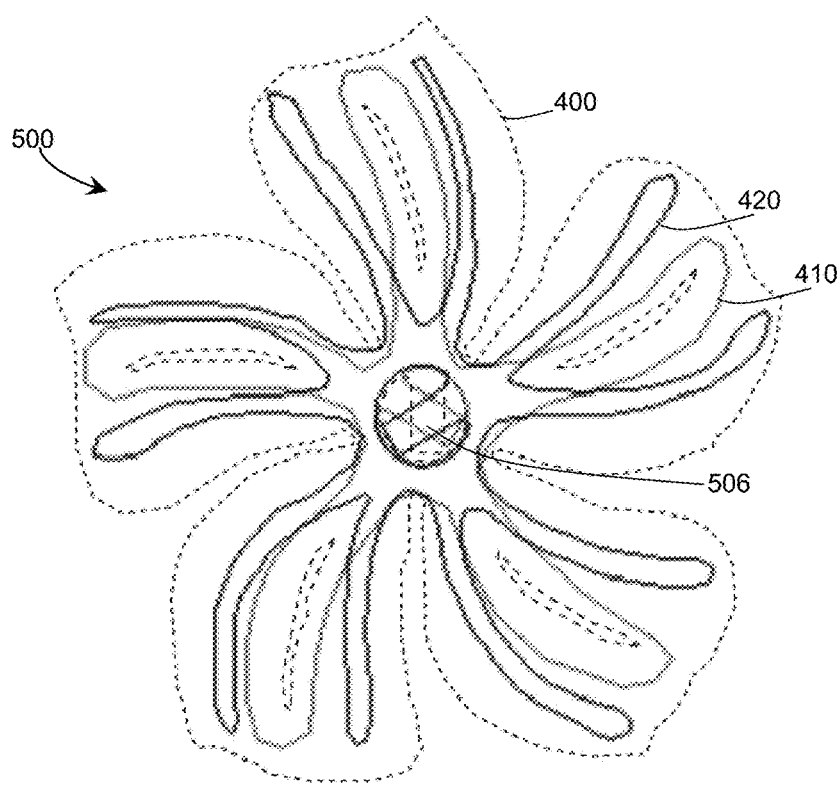
FIG. 5 is a schematic illustrating an exemplary composite display using the electrophoretic display layers of FIGS. 4A-4C.

An example of a composite electrophoretic display according to an aspect of the present application is now described with respect to FIGS. 4A-5. This embodiment includes three individual electrophoretic displays. That is, different electrophoretic displays 400, 410, and 420 form an exemplary composite display in the shape of a flower are illustrated in FIGS. 4A, 4B, 4C, and 5. Displays 400, 410, and 420 have varying shapes and may be, but need not be, configured to display different colors. For example, display 400 may display yellow and white, display 410 may display blue and white, and display 420 may display red and white, such that when combined they produce a composite display having different colors with the three-dimensional shape of a flower. Different color states may include any color, such as black, white, red, orange, yellow, green, blue, indigo, violet, cyan, or magenta as well as gray states (i.e., an intermediate optical state as described above) and/or light-transmissive states (i.e., shutter mode as described above) thereof. Openings 402 within display 400 may allow portions of a display beneath display 400 to be viewed from the same surface. In this example, as shown in FIG. 5, display 410 may be positioned beneath display 400 such that portion 412 of display 410 may be viewed through openings 402 of display 400.

Additionally, displays 400, 410, and 420 have electrical connection regions 404, 414, and 424, respectively. Electrical connection regions 404, 414, and 424 are positioned at the center region of the flower shape and are offset from each other so as not to completely overlap. In this example, electrical connection regions 404, 414, and 424 are offset from each other by different angles.

Figure 7:
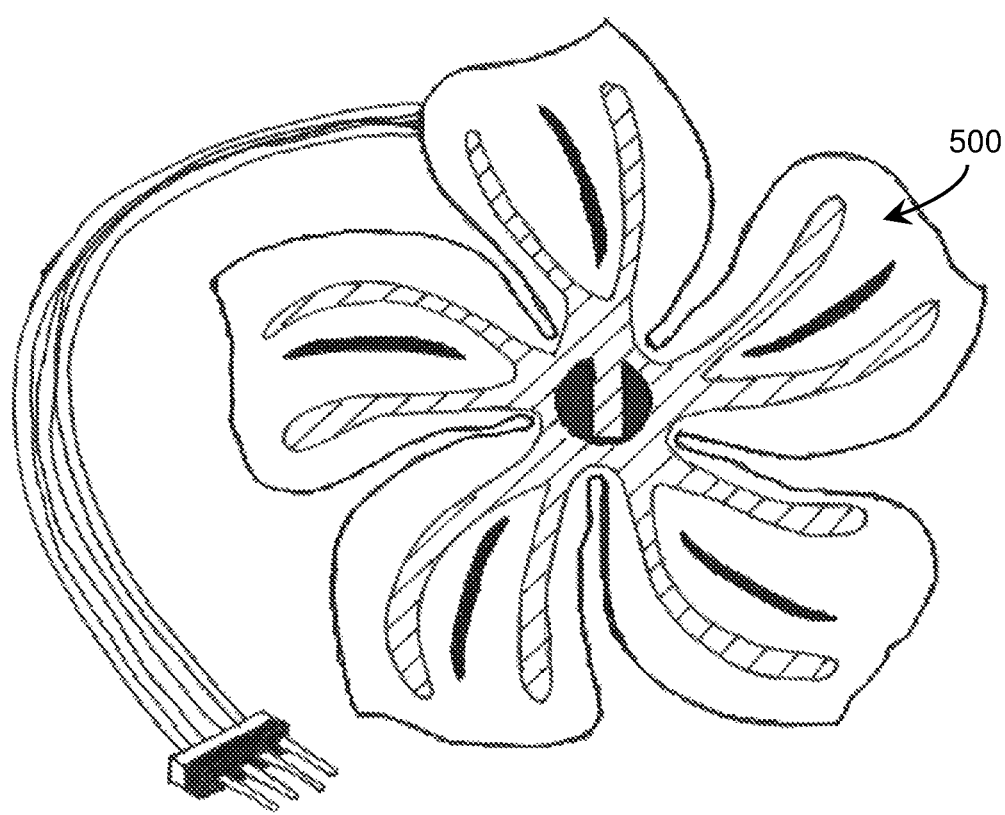
FIG. 7 is a photograph of an exemplary composite display configured as a flower and representing an implementation of a composite display similar to FIG. 5.

FIG. 5 illustrates exemplary composite display 500 formed by overlaying displays 400, 410, and 420 illustrated in FIGS. 4A-C in a stacked configuration. In this example, the composite display may be formed by overlaying display 400 over display 410 and overlaying display 420 over display 400 such that the displays are ordered as 420, 400, and 410. Displays 400 and 410 are positioned such that portions of display 410 are viewed through the openings 402 in display 400. In this manner, at least some portion of each of displays 400, 410, and 420 may be viewed from the same surface. FIG. 7 shows a photograph of the resulting composite display 500, which is shaped as a flower with each electrophoretic layer capable of switching colors.

Figure 6:
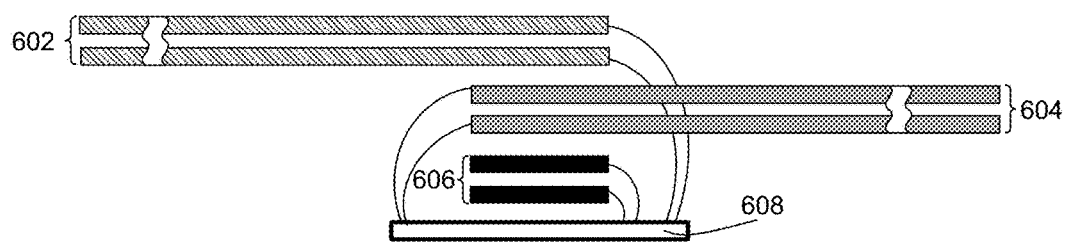
FIG. 6 is a (side-view) cross-sectional diagram of an electrical connection region of an exemplary composite display.

Displays 400, 410, and 420 are positioned such that the electrical connection regions are within a compact region 506 of the composite display. FIG. 6 illustrates an exemplary cross-sectional view of an electrical connection region, such as 506 of composite display 500, where multiple displays 602, 604, and 606 are coupled to drive circuitry on printed circuit board 608. Displays 602, 604, and 606 are offset such that electrical connections can be formed between each display and PCB 608. Both front and rear electrodes of displays 602, 604, and 606 are coupled to printed circuit board 608 using any suitable type of connection, examples of which have been described previously herein and include rivets, wires, able connectors, or other flexible or rigid conductive connections. In this example, the electrical connection region of display 602 extends from the left, the electrical connection region of display 604 extends from the right, and the electrical connection region of display 606 extends out from the plane of view. In this manner, portions of each display are accessible to couple to the drive circuitry provided by printed circuit board 608.

Figures 8A, 8B:
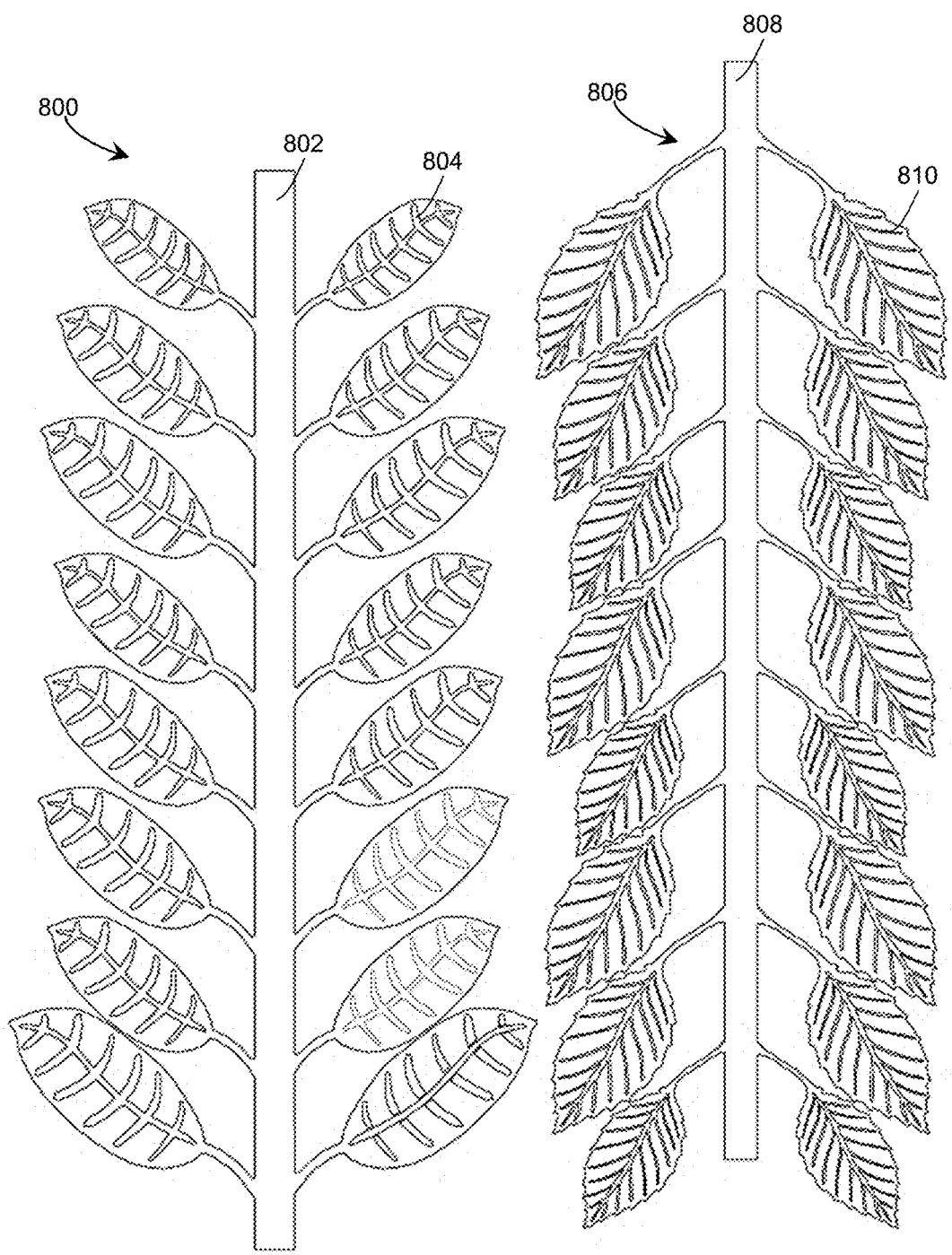
FIGS. 8A and 8B illustrate different exemplary composite displays.

The shape of composite display 500 of FIG. 5 is not limiting. Alternative examples of composite displays which may be formed by combining different electrophoretic displays according to techniques of the present application are illustrated in FIGS. 8A and 8B. FIG. 8A illustrates a composite display 800 and FIG. 8B illustrates a composite display 806. Each of these two composite displays has the shape of leaves on a stem or branch and may include two individual electrophoretic displays. That is, each of composite display 800 and 806 may be formed by combining a first electrophoretic display having the shape of the leaves and a second electrophoretic display to illustrate details of the individual leaves (e.g., leaf veins).

For example, composite display 800 may be formed by positioning display 802 having openings 804 over a second display. The display 802 may have a periphery as shown, representing leaves on a stem. The second electrophoretic display of composite display 800 may be visible through the openings 804 of the display 802. In this manner, the visual effect of veins on the individual leaves of display 802 may be provided.

Similarly, composite display 806, which provides a different type of leaf shape than composite display 800, may be formed by positioning display 808 having openings 810 over a second display. The second display may thus be visible through the openings 810. In this manner, a visual effect may be provided of a different type of leaf veins than in composite display 800.

The composite displays of FIGS. 8A and 8B allow for a single electrophoretic display (for example, the display underlying displays 800 and 806) to provide aesthetic details (e.g., leaf veins) at multiple spatial locations of the composite display. In this manner, the number of electrical connections can be less than if there were separate electrophoretic displays to provide the details at each leaf position.

Figure 9:
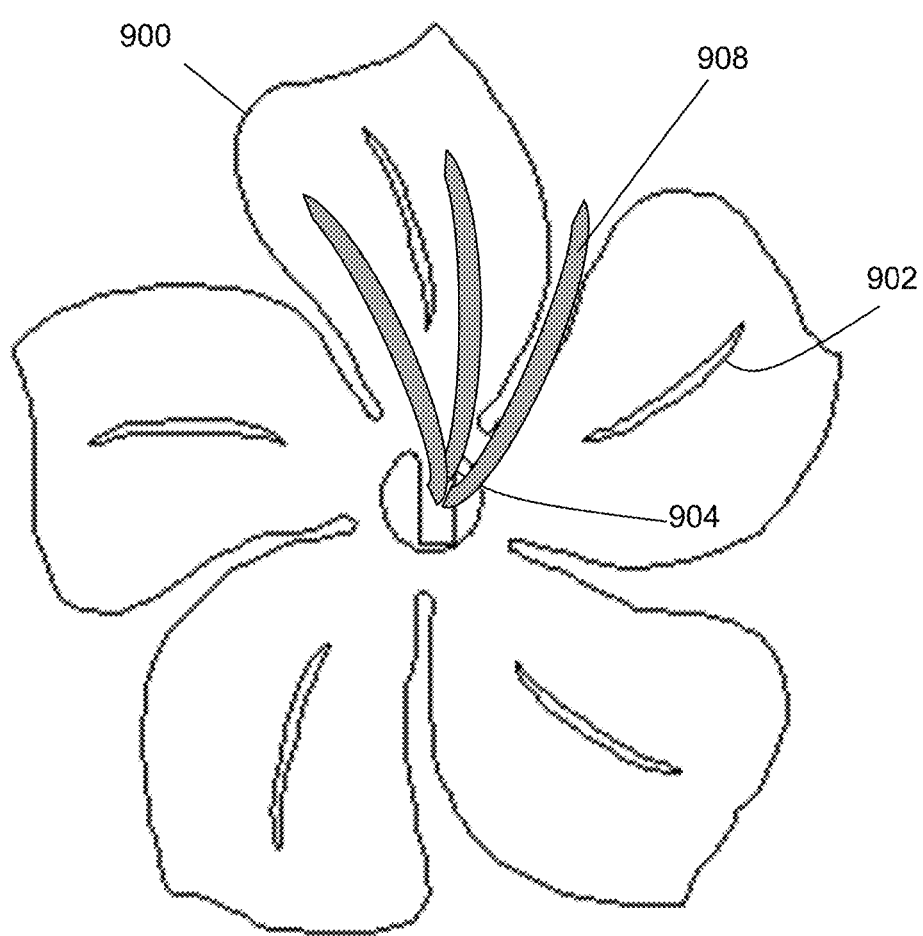
FIG. 9 shows a composite electrophoretic display wherein the discrete display elements create a three dimensional object.

A feature of the composite displays described herein which should be appreciated is that they provide displays with textural effects. By stacking individual electrophoretic displays a 3D display is created, which may create physical features (e.g., ridges, grooves, bumps, etc.) which may be seen and felt. For example, displays may be handled by users and the 3D textures provide a different dimension of interaction with the user than displays which are visual only. Moreover, the ability to shape the displays with irregular contours (e.g., to represent a flower, animal, etc.) may offer a dimension of interaction with users differing from conventional displays. In some embodiments, for example as shown in FIG. 9, additional electrophoretic display elements 908 can be coupled to an electrophoretic display 900 to achieve a truly three-dimensional structure, i.e., a structure that extends in all three dimensions. The additional electrophoretic display elements 908 may also be coupled to a drive circuitry through a common connection 904 or a common printed circuit board. Where needed, the additional display elements may be supported by structural elements such as wire.

Figure 10:
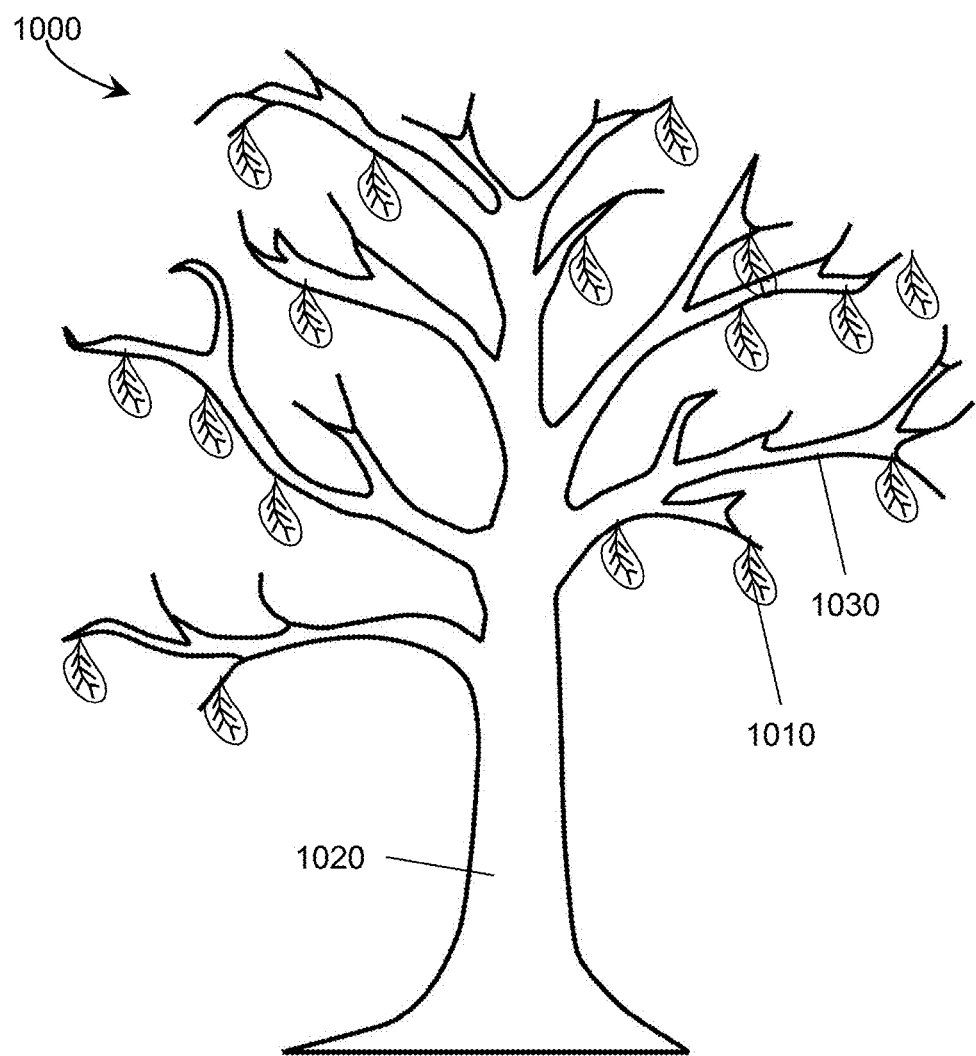
FIG. 10 shows layered electrophoretic materials used in combination with conventional media, such as wood, to produce a dynamic piece.

To add additional visual or tactile dimensions to the composite displays, the electrophoretic portions can be combined with other "conventional" aesthetic or structural elements. These elements may be, for example, wood, metal, stone, glass, fabric, plastic, or ceramic. In some embodiments the electrophoretic displays can be coordinated with the conventional elements to create a structure whose overall appearance can be varied with time. As an example, FIG. 10 shows a tree 1000 having leaves 1010 comprising overlapping electrophoretic display elements similar to those shown in FIGS. 8A and 8B. The tree 1000 includes a trunk 1020 and branches 1030 that are constructed from real wood, (e.g., a dead trunk and branches) and provide structural support for the electrophoretic leaves 1010 as well as a structure for hiding the wires and circuitry to drive the electrophoretic leaves 1010. Such structures can be used to create an art installation, such as a tree in the lobby of a building, to take on a range of colors as the seasons change. Such structures could also be used for a set of a play, where it may be desirable to portray a change in the seasons during a scene or between scenes.

Figure 11A:
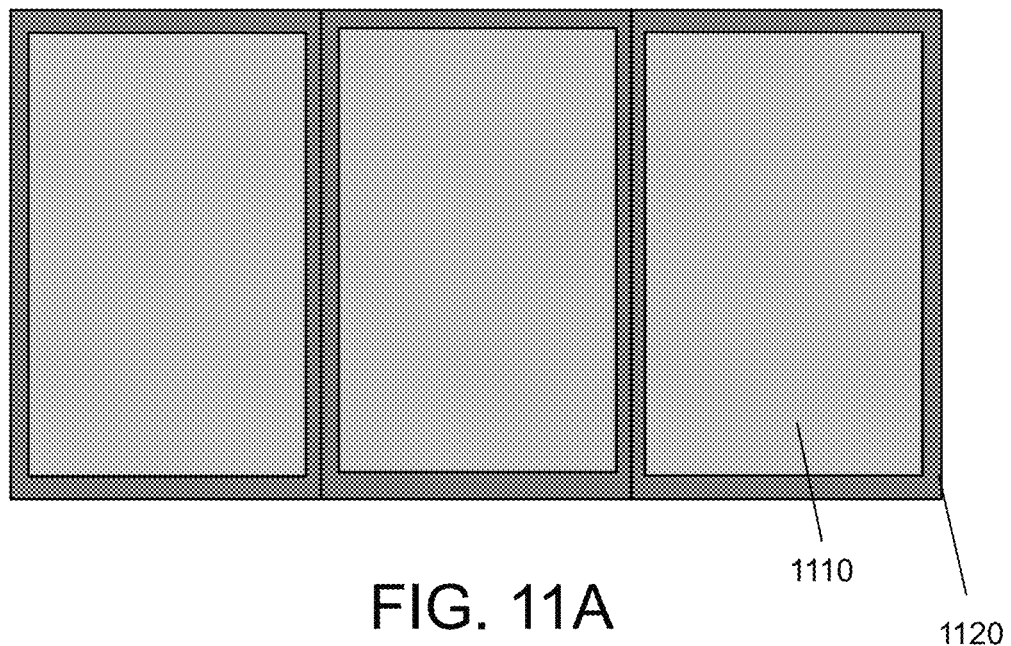
FIG. 11A shows tiled electrophoretic displays.
Figure 11B:
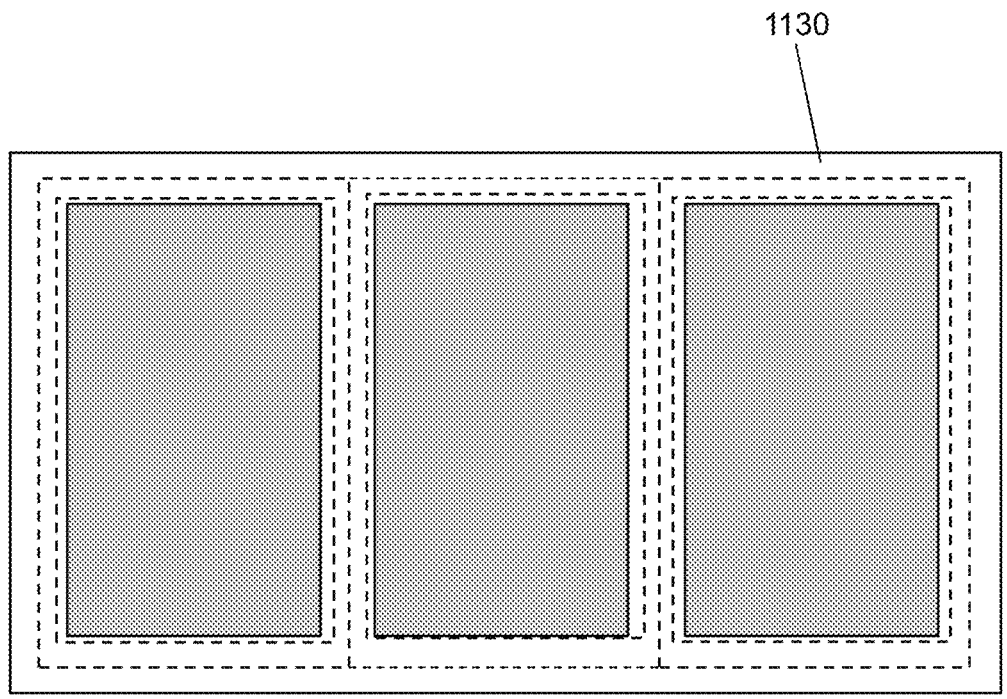
FIG. 11B shows the tiled electrophoretic displays of FIG. 11A wherein a second layer of electrophoretic material is used to frame the tiled displays and to hide the seams between the tiled displays.

In addition to creating artistic works, layering electrophoretic displays makes it possible to hide seams, bezels, or defects on larger displays. For example, as shown in FIG. 11A, large displays 1110 typically have a non-active area around the perimeter of the display 1120. Thus, when two large displays are aligned in a plane, a visible seam is formed between the displays. The non-active area 1120 can be especially pronounced in an active matrix display because of the need for additional space to hold the circuitry for controlling the pixels. Using an overlaying electrophoretic display 1130, it is possible to hide the non-active areas 1120, as shown in FIG. 11B. The overlaying electrophoretic display 1130 may have a similar color set or a different color set as compared to the large area displays 1110. As shown in FIG. 11B, the overlaying electrophoretic display 1130 can be cut from a single, continuous roll of electrophoretic display in a pattern that fully covers the underlying seams so that the composite display appears to be a single, continuous display. The large displays 1110 and the overlaying electrophoretic display 1130 may also be flexible, which allows the composite display to be wrapped over a curved surface such as the body of a bus or train car.

Figure 12A:
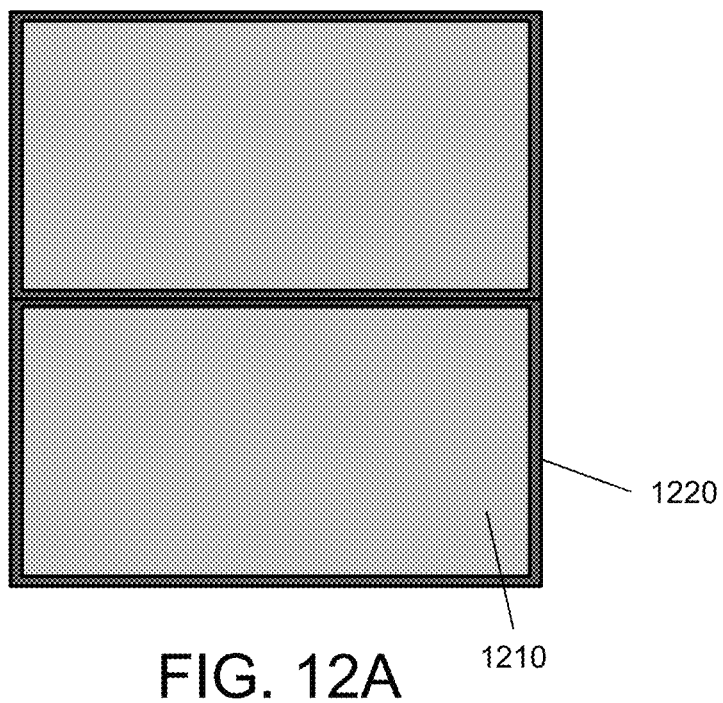
FIG. 12A shows tiled electrophoretic displays.
Figure 12B:
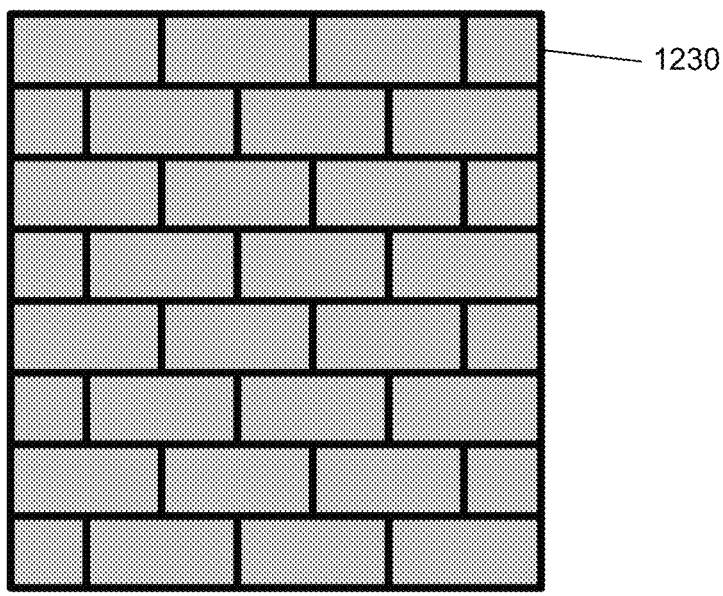
FIG. 12B shows the tiled electrophoretic displays of FIG. 12A wherein a patterned second layer of electrophoretic material is used to hide the seams between the tiled displays.

The example shown in FIGS. 11A and 11B should not be seen as limiting, however. A variety of layered electrophoretic displays could be used to create a desired effect. FIGS. 12A and 12B show that an overlaying electrophoretic display 1230 can be cut in a brick pattern and laid over abutting displays 1210 to hide the non-active areas 1220 of the displays. The composite display of FIG. 12B may allow the "mortar" between the bricks to change between black and white, as well as gray levels between. The abutting displays 1210 could be active matrix displays and include a variety of colors or full-color, thereby providing a wide range of hues and patterns for the purposes of changing the architectural look of the composite display shown in FIG. 12B. In other embodiments, the abutting displays 1210 may be simple two-color changing films that allow the abutting displays 1210 to switch between, e.g., a deep red and white, as well as gray levels in between. Of course, the overlaying electrophoretic display 1230 could be any pattern that was useful for hiding the non-active areas 1220, such as squares, pentagons, hexagons, herringbone, diamonds, circles, etc. Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A composite electrophoretic display comprising:
   first, second, and third discrete electrophoretic displays arranged with the first discrete electrophoretic display stacked atop the second and third discrete electrophoretic displays, wherein the first electrophoretic display comprises a plurality of openings through which the second and third electrophoretic displays can be viewed and wherein the first electrophoretic display covers a seam of non-active material between the second and third electrophoretic displays,
      wherein each discrete electrophoretic display includes a front electrode, a rear electrode, and an electrophoretic medium between the front electrode and the rear electrode; and
      drive circuitry coupled to the three discrete electrophoretic displays and configured to drive the three discrete electrophoretic displays separately by providing drive signals to the three discrete electrophoretic displays.

2. The composite electrophoretic display of claim 1, wherein the second and third discrete electrophoretic displays are at least 50% larger by area than the first discrete electrophoretic display.

3. The composite electrophoretic display of claim 1, wherein the three discrete electrophoretic displays have electrical connection regions configured to couple with the drive circuitry, and the connection regions are offset from each other.

4. The composite electrophoretic display of claim 1, wherein at least a portion of each discrete electrophoretic display is visible by a viewer in front of the composite display.

5. The composite electrophoretic display of claim 1, wherein the front or the rear electrode comprises segmented electrodes.

6. The composite electrophoretic display of claim 1, wherein the front or the rear electrode comprises an active matrix of electrodes.

7. The composite electrophoretic display of claim 1, wherein the three discrete electrophoretic displays are each flexible.

8. The composite electrophoretic display of claim 1, wherein the first discrete electrophoretic display is configured to switch between first and second colors and the second and third discrete electrophoretic display are configured to switch between third and fourth colors.

9. The composite electrophoretic display of claim 8, wherein the first color and the third color are the same color.

10. The composite electrophoretic display of claim 8, wherein the first, second, third, and fourth colors are all different colors.

11. The composite electrophoretic display of 1, further comprising a structural element comprising wood, ceramic, stone, or fabric.

12. The composite electrophoretic display of claim 1, wherein the second and third electrophoretic displays both comprise active matrix electrodes.

13. The composite electrophoretic display of claim 1, wherein the first electrophoretic display is configured to switch between first and second colors, the second electrophoretic display is configured to switch between third and fourth colors, and the third electrophoretic display is configured to switch between fifth and sixth colors.

* * * * *